3,256,364
DYEABLE POLYPROPYLENE COMPOSITIONS CONTAINING ETHYLENE-N-VINYL HETEROCYCLIC COMPOUND COPOLYMERS
George M. Bryant, South Charleston, and Nathan L. Zutty, Charleston, W. Va., assignors to Union Carbide Corporation, a corporation of New York
No Drawing. Filed Apr. 23, 1962, Ser. No. 189,304
9 Claims. (Cl. 260—895)

This invention relates to new and valuable polyolefin compositions. More particularly, it is concerned with polypropylene compositions which can be used to produce fibers which are readily dyed by conventional dyeing techniques and films having improved dyeability and printability.

Fibers of polypropylene, both homopolymeric and copolymeric, are well known. However, these fibers are very difficult to dye and, in general, defy dyeing by the conventional procedures. Several approaches have been taken in attempts to improve the dyeability of polypropylene; for example, graft polymerization with dye-receptive comonomers has been tried but this has affected the spinnability of the polymer and has not been commercially practical. Attempts have also been made to improve dyeability by blending the polypropylene with polyurethanes, polyamides, epoxy resins, and the like— again, with little or no success. At most, these procedures have resulted in moderate improvements in dyeability but these improvements have been offset by other problems, such as poor compatibility, resulting in poor product uniformity and spinning problems. Further, the dyeings obtained have not been satisfactory in depth of shade or fastness properties. Films made from the polyolefin resins have been found to be difficult to print on, and expensive and time consuming procedures, such as flame treatment or radiation, have been employed to improve the printability properties of such films. Also, in some instances it has been difficult to seal the edges of the films after such treatments.

It has now been found that polypropylenes suitable for use in the production of fibers can be rendered dye-receptive by incorporating in them a minor amount of a particular class of modifying copolymers. It has also been found that films of improved printability can be produced from the blends herein contemplated.

The polypropylenes used to prepare the modified polypropylene compositions of this invention have a density of above about 0.89 gram per cubic centimeter and a melt index of below about 100 decigrams per minute measured at 230° C.

The modifying copolymers incorporated with the polypropylene to produce the blends of this invention are the copolymers of ethylene with an N-vinyl heterocyclic compound of the formula

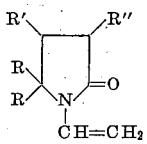

wherein each R, R', and R'', when taken separately, is a hydrogen atom and lower alkyl up to about 4 carbon atoms, and both R groups, when taken together, are an oxygen atom. Thus the N-vinyl heterocylic compounds are N-vinylsuccinimide, 3-methyl-N-vinylsuccinimide, 3,4-dimethyl-N-vinylsuccinimide, 3-ethyl-N-vinylsuccinimide, 3-propyl-N-vinylsuccinimide, 3-isopropyl-N-vinylsuccinimide, 3-butyl-N-vinylsuccinimide, N-vinylpyrrolidone, 3-(4- or 5-)methyl-N-vinylpyrrolidone, 3,4-(3,5- or 4,5-)dimethyl-N-vinylpyrrolidone, 3-(4- or 5-)ethyl-N-vinylpyrrolidone, 3-(4- or 5-)propyl-N-vinylpyrrolidone, 3-(4- or 5-)butyl-N-vinylpyrrolidone, and the like.

The modifying copolymers contain from about 0.5 percent to about 50 percent by weight of polymerized N-vinyl heterocyclic compound in the copolymer; preferably the concentration is from about 5 to 40 percent by weight, with the most preferred concentration being from about 10 to 30 percent by weight. Their melt indices were determined at 190° C.

The modifying copolymers are produced by conventional high pressure polymerization processes which are well known to the ordinary scientist skilled in the art; for example, a mixture of the comonomers is polymerized at elevated pressures above about 10,000 p.s.i.g. and at elevated temperatures above about 40° C. in contact with a catalyst which is capable of forming free radicals under the polymerization conditions employed. Among the catalysts which can be used are oxygen; peroxidic compounds such as hydrogen peroxide, diethyl peroxide, dipropionyl peroxide, acetyl peroxide, perbenzoic acid, dibenzoyl peroxide, perlauric acid, peracetic acid, acetyl benzoyl peroxide, di-tertiary-butyl peroxide, tertiary-butyl hydroperoxide, and so forth; azo type compounds such as disclosed in United States Patent 2,471,959, azo-bis-isobutyrylnitrile; the alkali metal and ammonium persulfates, perborates, and percarbonates; and the like.

The polypropylene compositions of this invention are produced by incorporating from about 1 percent to about 80 percent by weight of the modifying copolymer into the propylene polymer; preferably the concentration of modifying copolymer is from about 2.5 percent to about 40 percent by weight, with the most preferred concentration being from about 5 percent to about 20 percent by weight.

The improved compositions of this invention are homogeneous blends and can be prepared by mixing the solid polymers in conventional mixing equipment such as dough mixers, roll mixers, or Banbury mixers; by extrusion; or by fluxing the solid polymers. If desired, solution mixing can be used by proper selection of solvents. During this blending procedure antioxidants, heat stabilizers, delusterants, and other known additives can be added to the compositions.

Fibers can be spun from the polypropylene compositions of this invention by conventional spinning techniques; for example, the compositions can be melt spun or solution spun and the filaments can then be stretched to orient the molecules and develop the desired tensile properties in the fibers. The preferred compositions for fiber applications are those containing from 2.5 percent to 40 percent by weight, preferably 5 percent to 20 percent by weight of the modifying copolymer in the blend. The fibers produced from the compositions of this invention can be employed in the many applications in which synthetic fibers are used. These fibers are more readily dyed by conventional dyeing techniques to shades which are much deeper than have heretofore been obtainable on polypropylene fibers. Among the dyes that can be used are the well known acid dyes, disperse dyes, soluble vat dyes, azoic dyes, premetallized dyes, and the like. In a typical dyeing procedure with the acid dyes and premetallized dyes, a 50 to 1 dye bath ratio can be used, the bath containing 1 percent by weight of a methyl polyethanol quaternary amine, 2 percent sulfuric acid, and 3 percent of the dye, all based on the weight of the fiber. The dyeing is carried out for ninety minutes at the boil and the fiber is then rinsed, scoured, and dried. When a disperse dye is used, a typical dye bath contains 1 percent sodium N-methyl-N-oleoyl taurate, 2 percent of the disperse dye, a dye bath ratio of about 40 to 1 and a one hour boiling period.

The amount of dye on the fiber, or the depth of color, is approximately proportional to the $K/S$ value, which is a measure of the light reflected from the dyed sample. The larger the $K/S$ value, the deeper the shade, and a $K/S$ value of 20 indicates that the shade is approximately twice as deep as the shade represented by a $K/S$ value of 10. The determination of the $K/S$ values is set forth in an article by D. B. Judd, "Color in Business," Science and Industry, 1952, pages 314 to 342. Among the dyes that can be used to dye the fibers of this invention are the following:

Acid:
- Yellow 1 — C.I. 10,316
- Yellow 3 — C.I. 47,005
- Yellow 7 — C.I. 56,205
- Yellow 11 — C.I. 18,820
- Yellow 23 — C.I. 19,140
- Yellow 29 — C.I. 18,900
- Yellow 36 — C.I. 13,065
- Yellow 42 — C.I. 22,910
- Yellow 54 — C.I. 19,010
- Yellow 99 — C.I. 13,900
- Orange 1 — C.I. 13,090/1
- Orange 7 — C.I. 15,510
- Orange 10 — C.I. 16,230
- Orange 24 — C.I. 20,170
- Orange 49 — C.I. 23,260
- Orange 72 — C.I. 18,740
- Orange 74 — C.I. 18,745
- Red 1 — C.I. 18,050
- Red 12 — C.I. 14,835
- Red 14 — C.I. 14,720
- Red 26 — C.I. 16,150
- Red 34 — C.I. 17,030
- Red 37 — C.I. 17,045
- Red 73 — C.I. 27,290
- Red 85 — C.I. 22,245
- Red 89 — C.I. 23,910
- Red 115 — C.I. 27,200
- Red 116 — C.I. 26,660
- Red 134 — C.I. 24,810
- Red 179 — C.I. 19,351
- Violet 1 — C.I. 17,025
- Violet 7 — C.I. 18,055
- Violet 17 — C.I. 42,650
- Violet 43 — C.I. 60,730
- Blue 1 — C.I. 42,045
- Blue 9 — C.I. 42,090
- Blue 22 — C.I. 42,755
- Blue 25 — C.I. 62,055
- Blue 59 — C.I. 50,315
- Blue 83 — C.I. 42,660
- Blue 102 — C.I. 50,320
- Green 1 — C.I. 10,020
- Green 3 — C.I. 42,085
- Green 16 — C.I. 44,025
- Green 20 — C.I. 20,495
- Green 50 — C.I. 44,090
- Brown 14 — C.I. 20,195
- Brown 42 — C.I. 14,251
- Black 1 — C.I. 20,470
- Black 24 — C.I. 26,370
- Black 48 — C.I. 65,005
- Black 52 — C.I. 15,711

Basic:
- Yellow 1 — C.I. 49,005
- Yellow 9 — C.I. 46,040
- Orange 2 — C.I. 11,270
- Orange 15 — C.I. 46,045
- Red 1 — C.I. 45,160
- Red 9 — C.I. 42,500
- Violet 1 — C.I. 42,535
- Violet 3 — C.I. 42,555
- Violet 14 — C.I. 42,510
- Blue 5 — C.I. 42,140
- Blue 7 — C.I. 42,595
- Blue 26 — C.I. 44,045
- Green 4 — C.I. 42,000
- Brown 2 — C.I. 21,030

Disperse:
- Yellow 1 — C.I. 10,345
- Yellow 3 — C.I. 11,855
- Yellow 31 — C.I. 48,000
- Orange 1 — C.I. 11,080
- Orange 3 — C.I. 11,005
- Orange 7 — C.I. 11,240
- Red 1 — C.I. 11,110
- Red 4 — C.I. 60,755
- Red 11 — C.I. 62,015
- Red 13 — C.I. 11,115
- Red 15 — C.I. 60,710
- Red 17 — C.I. 11,210
- Violet 1 — C.I. 61,100
- Violet 4 — C.I. 61,105
- Violet 8 — C.I. 62,030
- Violet 13 — C.I. 11,195
- Blue 1 — C.I. 64,500
- Blue 3 — C.I. 61,505
- Blue 7 — C.I. 62,500
- Black 1 — C.I. 11,365
- Black 7 — C.I. 11,035

Azoic diazo components:
- Diazo 1 — C.I. 37,135
- Diazo 2 — C.I. 37,005
- Diazo 3 — C.I. 37,010
- Diazo 4 — C.I. 37,210
- Diazo 5 — C.I. 37,125
- Diazo 6 — C.I. 37,025
- Diazo 8 — C.I. 37,110
- Diazo 10 — C.I. 37,120
- Diazo 13 — C.I. 37,130
- Diazo 20 — C.I. 37,175
- Diazo 28 — C.I. 37,151
- Diazo 32 — C.I. 37,090
- Diazo 34 — C.I. 37,100
- Diazo 35 — C.I. 37,255
- Diazo 38 — C.I. 37,190
- Diazo 41 — C.I. 37,165
- Diazo 44 — C.I. 37,000
- Diazo 48 — C.I. 37,235

Azoic coupling components:
- Coupling 2 — C.I. 37,505
- Coupling 3 — C.I. 37,575
- Coupling 5 — C.I. 37,610
- Coupling 7 — C.I. 37,565
- Coupling 10 — C.I. 37,510
- Coupling 12 — C.I. 37,550
- Coupling 13 — C.I. 37,595
- Coupling 14 — C.I. 37,558
- Coupling 17 — C.I. 37,515
- Coupling 20 — C.I. 37,530
- Coupling 29 — C.I. 37,527
- Coupling 34 — C.I. 37,531
- Coupling 36 — C.I. 37,585 and the like. The Colour Index numbers are those listed in the latest Colour Index.

The polypropylene compositions of this invention are readily extruded by conventional procedures to produce rods, films, and protective coatings. The films so obtained are amenable to printing by conventional procedures without any further surface treatment of the film being necessary.

The modifying copolymers added to the propylene polymers to produce the polypropylene compositions of this invention are readily compatible with the propylene polymers and relatively clear, tough compositions are obtained. These blends show little sweat-out on heating, good product uniformity, improved printability, reduced fibrillation, and many other desirable properties.

The melt index and density of the compositions of this invention were determined using the test procedures set forth as ASTM D1238-52-T and ASTM D1505-57, respectively.

In the following examples, which are not to be construed as limiting the invention in any manner whatsoever, parts are by weight unless otherwise indicated.

Example 1

A copolymer was produced by polymerizing a mixture of 70 percent by weight of ethylene and 30 percent by weight of N-vinylpyrrolidone. The polymerization was carried out at 15,000 p.s.i.g. and at 70° C. using 3,260 parts per million by weight based on monomers of azo-bis-isobutyronitrile as catalyst. There was recovered 85 grams of a 75/25 ethylene/N-vinylpyrrolidone copolymer which had a melt index of 257 dgm./min. at 190° C., density of 1.018 g./cc., stiffness modulus of 4,308 p.s.i., tensile strength of 1,855 p.s.i., and elongation of 464 percent.

A blend was prepared by roll milling polypropylene having a melt index of 4 dgm./min. and a density of 0.91 g./cc. and sufficient amount of the above copolymer so that the blend had a 7.5 percent by weight copolymer concentration. The blending was carried out on a roll mill at 170° C., and it was readily accomplished without any sign of incompatibility of the two resins being observed. The blended composition was transferred to an extruder and the polymer blend was melt spun at 280° C. through a spinnerette having fifteen holes, each 0.030 inch in diameter. The orifice velocity was 16.6 feet per minute and the take-up velocity was 1,200 feet per minute. The multifilament yarn was then stretched 400 percent in a steam atmosphere (Yarn I).

In a similar manner a 91/9 ethylene/N-vinylpyrrolidone copolymer was produced and blended with polypropylene at 170° C. to give a 10 percent concentration of the copolymer in the blend. The modified blended composition was melt spun in the same manner as previously indicated (Yarn II).

A control yarn (Yarn III) was spun in the same manner for comparison purposes using the same polypropylene blended with 10 percent polyethylene having a melt index of 2 dgm./min. and a density of 0.918 g./cc. The properties of the three yarns are summarized below.

| Yarn | I | II | III |
|---|---|---|---|
| Tenacity, g.p.d. | 3.72 | 3.54 | 3.9 |
| Elongation, Percent | 26.3 | 51.0 | 71 |
| Stiffness Modulus, g.p.d. | 40.0 | 28.7 | 28 |
| Shrinkage, percent in boiling water | 11.8 | 12 | 10.4 |

Samples of each of the above yarns were dyed by the previously indicated procedures. In all instances Yarn III showed negligible dyeability, whereas Yarns I and II were dyed medium deep to deep shades. The results are tabulated below.

| Yarn | K/S Values | | |
|---|---|---|---|
| | I | II | III |
| Acid Dyes: | | | |
| Acid Blue 25 (C.I. 62,055) | | 6.2 | 0.7 |
| Acid Red 116 (C.I. 26,660) | | 7.7 | 0.8 |
| Acid Orange 1 (C.I. 13,090) | | 11.5 | 1.1 |
| Disperse Dyes: | | | |
| Disperse Red 3 (C.I. 61,505) | 21.7 | | 8.6 |
| Disperse Red 15 (C.I. 60,710) | 15.7 | | 2.0 |
| Disperse Red 17 (C.I. 11,210) | 7.4 | 15.1 | |
| Basic Dyes: | | | |
| Basic Red 13 | | 1.6 | 0.0 |

In a similar manner blends of polypropylene with copolymers of ethylene with 3-methyl-N-vinylpyrrolidone or 3,4-dimethyl-N-vinylpyrrolidone or 3-butyl-N-vinylpyrrolidone produce filaments and films which are readily dyeable to deeper shades than polypropylene per se or blends of polypropylene with polyethylene. In addition, the films are readily printable by conventional printing techniques.

Example 2

A copolymer was produced by polymerizing a mixture of 90 percent by weight of ethylene and 10 percent by weight of N-vinylsuccinimide. The polymerization was carried out at 15,000 p.s.i.g. and at 70° C. using 4,550 p.p.m. of azo-bis-isobutyronitrile as catalyst. There was obtained a solid ethylene/N-vinylsuccinimide copolymer having a melt index of 0.152 dgm./min., stiffness modulus of 34,152 p.s.i., tensile strength of 2,225 p.s.i., density of 0.9412 gram/cc., and elongation of 264 percent. The copolymer contained 16.5 percent polymerized N-vinylsuccinimide.

Ten parts of the above copolymer and 90 parts of polypropylene having a melt index of 4 dgm./min. and a density of 0.91 gram/cc. were milled together on a heated roll mill at 170° C. The blending was readily accomplished without any sign of incompatibility of the two resins being observed. The blended composition was transferred to an extruder and the polymer blend was melt spun at 280° C. through a spinnerette having fifteen holes, each 0.030 inch in diameter. The orifice velocity was 16.6 feet per minute and the take-up velocity was 1,200 feet per minute. The multifilament yarn was then stretched 300 percent in a steam atmosphere (Yarn IV). A control yarn (Yarn V) was spun in the same manner for comparison purposes using the same unmodified polypropylene.

Samples of each of the above yarns were dyed by the procedures previously indicated. The control yarn showed negligible dyeability while Yarn IV was dyed to medium deep to deep shades. The dyeing results are tabulated below.

| Yarn | K/S Values | |
|---|---|---|
| | IV | V |
| Disperse Red 17 (C.I. 11,210) | 8.4 | 1.7 |
| Basic Red 13 | 2.2 | 0.0 |
| Acid Blue 102 (C.I. 50,320) | 1.2 | |

In a similar manner blends of polypropylene with copolymers of ethylene and 3-methyl-N-vinylsuccinimide or 3,4-dimethyl-N-vinylsuccinimide produce filaments which are dyeable to deeper shades than polypropylene per se.

Example 3

A copolymer was produced by polymerizing a mixture of 90 percent by weight of ethylene and 10 percent by weight of N-vinylsuccinimide. The polymerization was carried out at 15,000 p.s.i.g. and at 70° C. using 0.233 percent by weight, based on monomers, of azo-bis-isobutyronitrile as catalyst. There was recovered a 62.5/

37.5 ethylene/N-vinylsuccinimide copolymer which had a melt index of 3.46 dgm./min., density of 1.1014 g./cc., stiffness modulus of 60,457 p.s.i., tensile strength of 4,952 p.s.i., and elongation of 578 percent.

A homogeneous blend was prepared by roll milling at 170° C. 90 parts of polypropylene having a melt index of 4 dgm./min. and a density of 0.91 g./cc. with 10 parts of the above copolymer. The blended composition was melt spun at 290° C. through a spinnerette having twenty-five holes, each 0.030 inch in diameter. The orifice velocity was about 3 feet per minute and the take-up velocity was 450 feet per minute. The multifilament yarn was stretched 218 percent in a steam atmosphere (Yarn VI). The yarn had a denier of 228, a tenacity of 3.8 g.p.d., an elongation of 30 percent, stiffness value of 39 g.p.d., and boiling water shrinkage of 6 percent. The yarn was readily dyed by the previously indicated procedures with Disperse Red 17 (C.I. 11,210) and Basic Blue 4 (C.I. 51,004) to medium deep and medium shades respectively. A control yarn of unmodified polypropylene was not dyed.

While the disclosure stresses polypropylene, it is to be noted that other polyolefins from mono-alpha-olefins having from 2 to about 10 carbon atoms can be substituted for polypropylene. For example, polyethylene, poly(butene-1), poly(4-methylbutene-1), poly(hexene-1), poly(decene-1), and the like, or mixtures thereof.

What is claimed is:

1. A composition comprising a blend of (A) from about 20 to 99 percent by weight of a solid polypropylene and (B) from about 1 to 80 percent by weight of a copolymer of ethylene and an N-vinyl heterocyclic compound of the formula

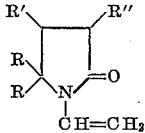

wherein each R, R', and R" when taken separately is a member selected from the group consisting of a hydrogen atom and lower alkyl of up to about 4 carbon atoms, and both R groups when taken together are an oxygen atom, said copolymer containing in the copolymer molecule from about 0.5 to 50 percent by weight of said N-vinyl heterocyclic compound copolymerized therein.

2. A composition comprising a blend of (A) from about 60 to 97.5 percent by weight of a solid polypropylene and (B) from about 2.5 to 40 percent by weight of a copolymer of ethylene and an N-vinyl heterocyclic compound of the formula

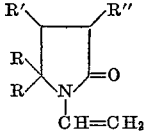

wherein each R, R', and R" when taken separately is a member selected from the group consisting of a hydrogen atom and lower alkyl of up to about 4 carbon atoms, and both R groups when taken together are an oxygen atom, said copolymer containing in the copolymer molecule from about 5 to 40 percent by weight of said N-vinyl heterocyclic compound copolymerized therein.

3. A composition comprising a blend of (A) from about 80 to 95 percent by weight of a solid polypropylene and (B) from about 5 to 20 percent by weight of a copolymer of ethylene and an N-vinyl heterocyclic compound of the formula

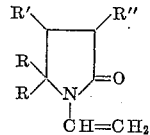

wherein each R, R', and R" when taken separately is a member selected from the group consisting of a hydrogen atom and lower alkyl of up to about 4 carbon atoms, and both R groups when taken together are an oxygen atom, said copolymer containing in the copolymer molecule from about 10 to 30 percent by weight of said N-vinyl heterocyclic compound copolymerized therein.

4. The composition of claim 1, wherein component (B) is a copolymer of ethylene and N-vinylsuccinimide.

5. The composition of claim 1, wherein component (B) is a copolymer of ethylene and N-vinylpyrrolidone.

6. The composition of claim 1 in the form of a filament.

7. The composition of claim 4 in the form of a filament.

8. The composition of claim 5 in the form of a filament.

9. The composition of claim 1 in the form of a film.

References Cited by the Examiner

UNITED STATES PATENTS

| | | | |
|---|---|---|---|
| 3,003,845 | 10/1961 | Ehlers | 260—895 |
| 3,073,794 | 1/1963 | Stoner | 260—895 |

FOREIGN PATENTS

| | | |
|---|---|---|
| 834,160 | 5/1960 | Great Britain. |
| 850,435 | 10/1960 | Great Britain. |

MURRAY TILLMAN, *Primary Examiner.*

LEON J. BERCOVITZ, *Examiner.*

J. A. KOLASCH, *Assistant Examiner.*